Oct. 19, 1971    M. E. LEVIN    3,613,267
TRANSPARENCIES TEACHING A METHOD INVOLVING MOVEMENT
Filed Jan. 29, 1970

INVENTOR
MARTIN E. LEVIN
BY *HIS ATTORNEYS*
*Learman & McCulloch*

United States Patent Office 3,613,267
Patented Oct. 19, 1971

3,613,267
TRANSPARENCIES TEACHING A METHOD INVOLVING MOVEMENT
Martin E. Levin, 30585 Birchway,
Franklin Village, Mich. 48025
Filed Jan. 29, 1970, Ser. No. 6,824
Int. Cl. G09b *19/00*
U.S. Cl. 35—29 R                          6 Claims

ABSTRACT OF THE DISCLOSURE

A device for teaching a method involving movement including a plurality of sheets sequentially movable into superposed relation. Each of the sheets includes a portion illustrating a representation of a person or an object in one different position of a plurality of different positions portraying a path of movement. At least one of the sheets includes a light permeable portion to facilitate the observation of the illustrating portion of a sub-adjacent sheet. When the successive sheets are in superposed relation, the progressive changes of the positions necessary to execute the entire movement may be simultaneously observed or if the sheets are separated and viewed individually any transitory position may be individually studied.

This invention relates to a new and improved printed article and more particularly to a plurality of printed sheets having transparent portions for progressively illustrating the complete action and steps involved in executing a rapid movement such as a golf swing or a ski turn.

It has been observed that the ability to learn how to execute a rapid movement can be facilitated if the movement is broken down into a series of individually sequenced positions which can be individually studied and related to the remaining individual position which make up the complete movement. In this manner, highly complex technicalities of a move can be isolated into a plurality of sequenced positions which may be viewed for prolonged periods to determine the relevance of one portion of the movement to the remaining individual portions of the movement. Advanced high-speed photographic techniques permit a complete movement to be photographed in a plurality of successive sequenced positions which provide a representation of the individual positions on separate photographs. The separate photographs or pictorial representations of the individual movements may then be mounted or printed on transparent sheets. The sheets are sequentially connected and may suitably comprise an integral portion of a magazine. As the sheets are placed into superposed relation, the relationship between the individual positions on the various sheets can be observed through the transparent sheets.

Accordingly, it is a prime object of the present invention to provide a device which will facilitate the teaching of a method involving movement.

It is another object of the present invention to provide a device for facilitating the teaching of a method involving movement which can be bound into book form.

Figure 1:
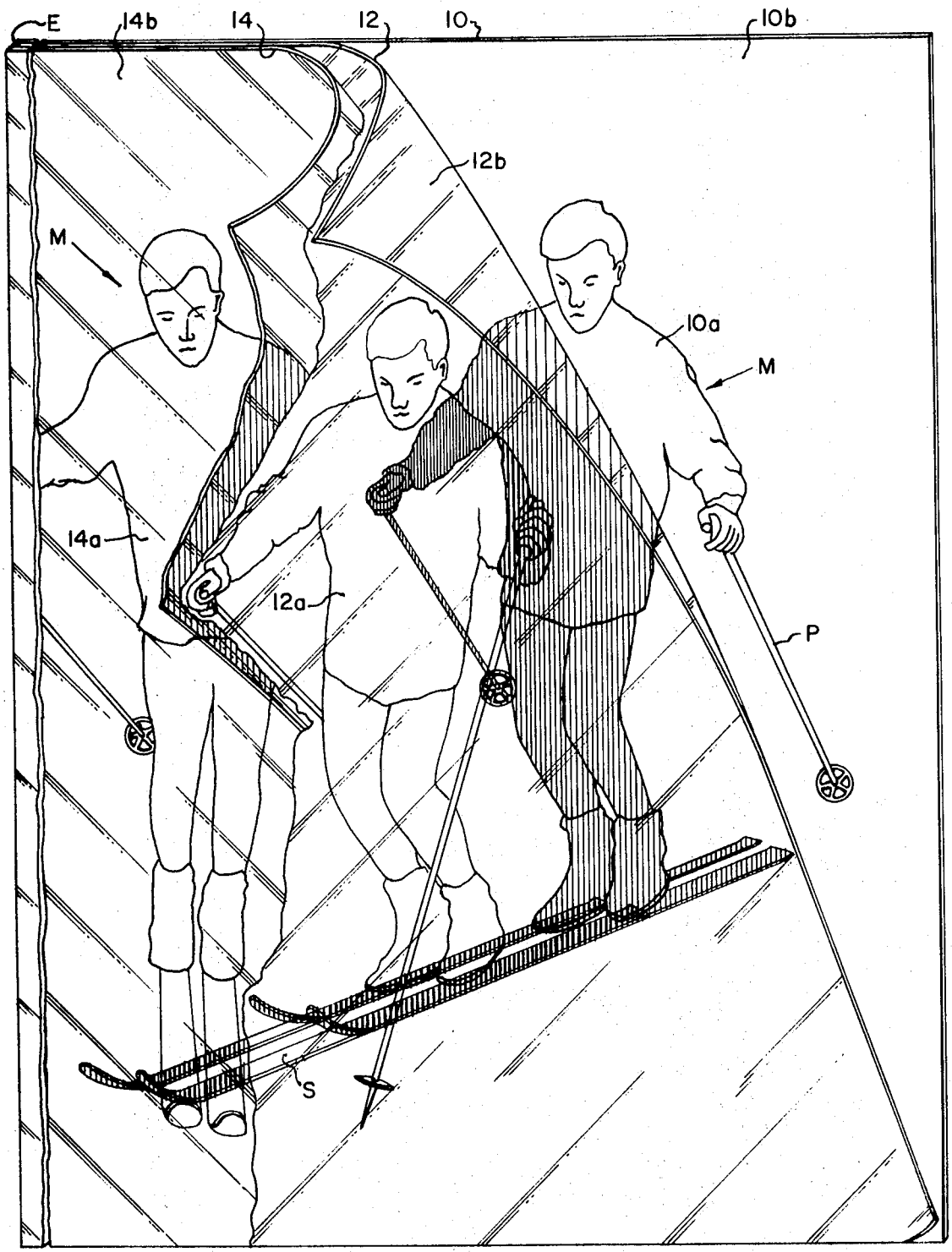
Figure 2:
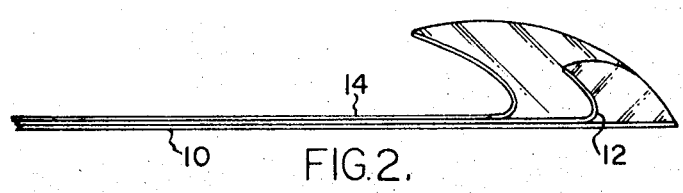

Other objects and advantages of the present invention will become apparent to one of ordinary skill in the art from the following description and accompanying drawings in which:

FIG. 1 is a front elevational view illustrating the sheets in superposed relation, with two sheets being slightly upturned, parts being broken away to more clearly illustrate the invention; and FIG. 2 is a fragmentary side elevational view of the device shown in FIG. 1.

Apparatus constructed according to the disclosed embodiment of the invention includes a plurality of sheets 10, 12 and 14 connected along one edge E in any suitable manner, the edge E being adapted to be bound into a magazine or a book. If desired, a pair of the sheets 10, 12 and 14 may be integrally formed and folded at the middle. The bottom sheet 10 is formed of opaque material whereas the sheets 12 and 14 are formed of light transmitting material which is preferably generally transparent. The sheets 10, 12 and 14 include portions 10*a*, 12*a*, and 14*a* respectively, illustrating a person M, wearing a pair of skis S and carrying ski poles P, in different successive positions which are assumed during a properly executed ski turn. The portions 10*a*, 12*a*, and 14*a*, are printed on the sheets 10, 12 and 14 in one or more colors in overlapping relation, as shown, in any well known manner. The composition which is used for printing the portions 12*a* and 14*a* is such that the sections 12*a* and 14*a* are light permeable, so as to facilitate the observation of the sub-adjacent portions 10*a* and 12*a*. The sub-adjacent portions 10*a* and 12*a* may also be observed through the light permeable portions 12*b* and 14*b* of the sheets 12 and 14.

The device, which can be used as an insert in a book or magazine, is used for teaching a person the method of negotiating a properly executed ski turn. The pictorial representation 10*a* illustrates the initial position of a person about to negotiate a ski turn, the portion 12*a* illustrates the person in a later adjusted position setting the ski poles immediately prior to the turn with the knees slightly bent and the person "sinking" into the hill, and the portion 14*a* illustrates the final upweighting stage of the turn, with the direction of the skis changed. By sequentially placing the sheets 10, 12 and 14 in superposed relation, a person may view the proper individual positions to be assumed during the execution of a turn and when they are in superposed relation can view the entire sequence of positions.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. A device for teaching a method involving movement comprising:

a plurality of sheet means sequentially movable into superposed relation, each of said sheet means including a portion illustrating a representation of a person or an object in one different position of a plurality of different successive overlapping positions in a path of movement; at least one of said sheet means including a light permeable portion facilitating observation of said illustrating portion of a sub-adjacent sheet means; the plurality of sheet means when in superposed relation permitting the observation of a progressive change of positions of the representations of the person or object as the movement is executed.

2. A device for teaching a method involving movement as set forth in claim 1 wherein one of said sheets is opaque.

3. A device for teaching a method involving movement as set forth in claim 1 wherein said illustrating portion of at least one of said sheets is opaque.

4. A device for teaching a method involving movement as set forth in claim 3 wherein said illustrating portion of at least one of said sheets is at least partly light permeable in an area of overlap with the underlying representation.

5. A device for teaching a method involving movement comprising: a plurality of sheet means, each including a light permeable section and a section illustrating a representation of a person or an object in one different position of a plurality of different successive positions in a path of movement; said plurality of sheet means being sequentially connected to be movable into superposed relation to facilitate the observation of a progressive change of positions of the representation of the person or object as the movement is executed.

6. A device as set forth in claim 5 wherein said illustrating section of at least one of said sheets is light permeable.

References Cited

UNITED STATES PATENTS

| | | |
|---|---|---|
| 258,164 | 5/1882 | Hoevenbergh. |
| 730,859 | 6/1903 | Austin. |
| 2,091,260 | 8/1937 | Farkas et al. |

HARLAND S. SKOGQUIST, Primary Examiner

U.S. Cl. X.R.

35—53